Patented Aug. 7, 1934

1,968,858

UNITED STATES PATENT OFFICE

1,968,858

DENTIFRICE

Washington Kyle Sheffield, New London, Conn., and Charles H. Dickson, Orange, N. J., assignors to Worcester Salt Company, New York, N. Y., a corporation of New York No Drawing. Application October 14, 1932, Serial No. 637,858

7 Claims. (Cl. 167—93)

Our invention relates to a dentifrice in the form of a tooth paste.

Heretofore, saline dentifrices of the powders and liquids type have been made but these are wasteful, messy, and particularly, no uniform action is assured.

It is an important feature of the present tooth paste that a stable plastic body mass is provided which contains colloidal members acting to stabilize the tooth paste, bind any water present so that the water is not active to dissolve the sodium chloride, and assure a stable tooth paste in which the sodium chloride is maintained uniformly dispersed in solid or crystalline state.

The present invention therefore comprises a stable paste, i.e., a plastic body mass free of separation of ingredients, and is characterized by having a substantial percentage of the dentifrice, i.e., its principal active ingredient, comprised of uncombined and available sodium chloride. A stable paste assures that the active material, namely the sodium chloride, will be maintained in solid, i.e., crystalline, form and will be distributed over the teeth and gums to obtain optimum cleansing and antiseptic effects. By stable, we mean that the ingredients of the body mass are inert with respect to each other and to the sodium chloride and aided by the colloidizing agents present, the paste maintains its uniform plastic texture with the sodium chloride permanently available therein in solid state. The paste is distributable in a controlled manner to reach every part of the mouth contacted by the toothbrush, and sodium chloride is instantly active and available for solution in the saliva. That is, the ingredients of the tooth paste not only maintain the sodium chloride free and uncombined, but when the paste is applied to the mouth, it is available for instant solution in the saliva and the plastic body mass does not act in any manner as a retardant; the sodium chloride instantly dissolves in the saliva and optimum properties of sodium chloride are instantly effective.

It is recognized by those engaged in dental research that salt is very beneficial, in that it is readily soluble in the saliva at body temperature, and has a marked germicidal action. Also, salt stimulates circulation of the gum tissues and exerts a healing and strengthening influence. In our tooth paste, we use various amounts of sodium chloride, usually twenty-five to seventy-five per cent by weight and preferably forty to forty-five per cent.

To this end, the present invention comprises a new product wherein a high percentage of salt is made available in uncombined state so that notwithstanding that relatively small dosage portions are used with the conventional toothbrush, the concentration of available sodium chloride will be sufficient to enable the salt to be therapeutically effective as the primary ingredient of the preparation.

A further object of the invention is to produce a dentifrice in which salt is the principal active ingredient and which will also contain an antiacid.

In the preparation of a tooth paste, such as is sold in conventional tubes, we employ a plasticizer and colloidizing agents as will be specifically later set forth including milk of magnesia, or other magma, a suitable abrasive, together with a flavor, if desired, and medicants in proper amounts also as desired. In order to give the mass the desired pasty form, we use a polyhedric alcohol, such as glycerine. The paste so prepared is essentially a mixture of plasticizer and colloids in which the sodium chloride is incorporated as the principal active ingredient, being present in available amount up to seventy-five per cent and preferably forty-two per cent.

In referring to the amount of salt present, it will be understood that we mean a substantial quantity, that is, more than twenty-five per cent of the weight of the mass is composed of uncombined sodium chloride, which, in the use of the paste, is highly concentrated as regards the rest of the ingredients, and is, therefore, the dominant ingredient upon the toothbrush.

We have recited broadly one product of our invention as constituting a mixture in which the salt is the principal active ingredient, and wherein colloids including an antiacid, such as milk of magnesia are employed as another important constituent.

The invention is also prepared by using the following materials likewise comprising plasticizer and colloids in substantially the proportions indicated:—

| | |
|---|---|
| C. P. glycerine | 37½ pounds |
| Neutral soap | 1½ pounds |
| Gum tragacanth | 1½ pounds |
| Magnesium carbonate (finely divided) | 13 pounds |
| Calcium carbonate (finely divided) | 51½ pounds |
| Milk of magnesia (magnesium hydroxide) | 31 pounds |
| Distilled water | 24 pints |
| Saccharin powder | 282 grains |
| Salt (finely divided) | 108 pounds |

*Flavor*

| | Ounces |
|---|---|
| Jap. menthol crystals | 2⅔ |
| Oil of peppermint U. S. P. | 8 |
| Oil of anise U. S. P. | ⅔ |
| Methyl salicylate | ⅔ |
| ##Flavor compound #04595 | 12 |

Flavor compound #04595 is comprised as follows:

| | Parts |
|---|---|
| Twice rectified oil of peppermint | 274 |
| Oil of eucalyptol | 90 |
| Oil of wintergreen | 45 |
| Rectified aniseed oil | 22½ |
| Safrol | 22½ |

In preparing a paste containing the above ingredients we proceed as follows:—

Into a mixing container of forty gallons capacity place the glycerine, water, soap, gum tragacanth, milk of magnesia, saccharin and mix the plasticizer and these several colloidizing agents well with a rapid mixer. Then add flavor which should be made a few days in advance and run for fifteen minutes. Transfer contents of the container to small mixer, add the salt (NaCl) and run for five minutes. Then add magnesium carbonate and run for five minutes.

Then feed calcium carbonate to the pasty mass and when all has been taken up by mixing, run for twenty minutes. Let the mass comprising plasticizer and colloidizing agents stand for about twelve hours and stir slowly for ten minutes before filling into conventional dispensing tubes from which it may be extruded as required. By reason of this method of preparation, the sodium chloride is uniformly and permanently suspended through the stable body mass.

The tooth paste of our invention prepared as described is a mixture, but certain effects take place whereby the plastic mass is rendered stable and permanent, and the sodium chloride maintained available for instant dissolving in the saliva and free and uncombined. The colloids present, as will be clear, act to protect the sodium chloride whereby it remains permanently and uniformly dispersed in the plastic mass in a highly concentrated percentage.

It is further to be noted that the water present is in relatively small amount and is present as bound water. That is to say, there is insufficient water or other solvent to produce any appreciable solution of sodium chloride because the presence of colloidal ingredients, such as milk of magnesia, act to bind the water and stabilize the tooth paste. Hence, no objectionable diminution of the available sodium chloride occurs by reason of the sodium chloride going into solution and the sodium throughout the body mass in solid state. Furthermore, the paste maintains its plastic body mass structure and does not break down or separate to assume a water texture and there is no opportunity for the uniform concentration of sodium chloride in the paste to be objectionably changed or the sodium chloride to be dissolved.

It will be observed that in accordance with this invention the sodium chloride constitutes the basic part of the dentifrice, and, as stated, the salt is present in an amount which is preferably forty-two percent of the mass by weight.

While we may use medicated or pre-treated salt, we prefer to use the ordinary refined, i.e., fine granulated sodium chloride of commerce. Since the amount of dentifrice upon a toothbrush is relatively small, by having a high concentration of available uncombined sodium chloride, we find that it is immediately active, i.e., soluble in the saliva at body temperature to stimulate circulation of the gum tissues and acts as an effective germicide. The presence of milk of magnesia also insures that the product will be alkaline.

The products described herein are stable over long periods of time and under usual conditions, which we consider is due to the manner in which we prepare the product. As a matter of fact, it is extremely difficult to maintain a high percentage of available sodium chloride, but by preparing a mixture in accordance with this application, it is found that the sodium chloride remains stable in the product without substantial loss over long periods of time.

As heretofore stated, some powder or liquid dentifrices using sodium chloride are known, but are objectionable in that a dry powder or a liquid will fall or drip from the brush and be both wasteful and messy and, most important, these products are not susceptible of effective application and distribution on the gums and teeth as is true of a paste. That is, a paste is applicable in a controlled manner to reach every part of the mouth contacted by the toothbrush. In the case of powders and liquids, the amount of sodium chloride which normally is available on the toothbrush is negligible, whereas with the present invention, the concentration of available sodium chloride in the paste on the toothbrush is sufficiently high to produce the very desirable therapeutic results.

We have, therefore, provided a stable and permanent mixture, wherein the principal active ingredient is sodium chloride, and which is prepared in such a manner that the tooth paste will stay in substantially its initially prepared state without the possibility of any of the essential constituents separating out or combining to objectionably affect the efficacy of the product. Obviously, such a mixture wherein the ingredients are inert and protective of the sodium chloride can be used with assurance of optimum therapeutic effect. Furthermore, as pointed out, the sodium chloride is instantly active, that is, the ingredients of the body mass do not act in any manner to retard the instant dissolving of the salt in the saliva or interfere with the effect of the optimum salt properties.

Furthermore, we employ in this stable compound an antiacid in the form of a magma, such as milk of magnesia. We attribute the stability of the product to the presence of the colloidizing agents including this magma. This colloidal member particularly acts to bind the water present, so that the sodium chloride is permanently made available in solid undissolved condition. That is, the presence of the milk of magnesia particularly retards the solvent action of water upon the sodium chloride, and stabilizes the plastic body. The glycerine and the small percentage of gum tragacanth or other similar demulcent render the mass pasty. The gum tragacanth also acts as a protective colloid to stabilize the body mass and maintain the salt in solid or crystalline condition.

While we have recited a particular flavor herein, it will be understood that any desired flavor is employed, in accordance with the particular taste, but such other flavors of which there are commercial varieties available may be selected and possess such characteristics as not to react unfavorably to destroy the stability of the tooth paste.

It will be understood that equivalent substances may be used in the mixture, the essential characteristic of which, however, is the presence of a very high concentration of sodium chloride, which remains pemanently available and uncombined in the final product.

We claim:

1. A sodium chloride tooth paste of uniform paste-like consistency, consisting of a plastic body mass having colloidal means for binding any water present to render the same inactive as a solvent for sodium chloride, and sodium chloride in substantially undissolved and solid state uniformly dispersed in said body mass and in concentration to be therapeutically effective, the body mass being stable and free of separation of ingredients and maintaining said sodium chloride in solid state.

2. A sodium chloride tooth paste of uniform paste-like consistency, consisting of a plastic body mass having a colloidal means comprising milk of magnesia for binding any water present to render the same inactive as a solvent for sodium chloride, and sodium chloride in substantially undissolved and solid state uniformly dispersed in said body mass and in concentration to be therapeutically effective, the body mass being stable and free of separation of ingredients and maintaining said sodium chloride in solid state.

3. A sodium chloride tooth paste of uniform paste-like consistency, consisting of a plastic body mass having a colloidal means for binding any water present to render the same inactive as a solvent for sodium chloride, and sodium chloride in substantially undissolved and solid state uniformly dispersed in said body mass and in amount from substantially 25% to substantially 75%, the body mass being stable and free of separation of ingredients and maintaining said sodium chloride in solid state.

4. A sodium chloride tooth paste of uniform paste-like consistency, consisting of a plastic body mass having a colloidal means for binding any water present to render the same inactive as a solvent for sodium chloride, and sodium chloride in substantially undissolved and solid state uniformly dispersed in said body mass and in amount of about 40%, the body mass being stable and free of separation of ingredients and maintaining said sodium chloride in solid state.

5. A stable sodium chloride tooth paste comprising a plastic body mass having incorporated therein a colloidal agent and sodium chloride in a therapeutically effective amount, said colloidal agent maintaining said sodium chloride in an uncombined crystalline state of uniform dispersion throughout said mass.

6. A stable sodium chloride tooth paste comprising a plasticizer and colloidal agents forming a plastic body mass, the respective ingredients of the body mass inert with respect to each other, and sodium chloride in therapeutically effective amount incorporated in said body mass, the ingredients of the body mass being inert with respect to the sodium chloride, said colloids maintaining the body mass stable and the sodium chloride in an uncombined crystalline state of uniform dispersion throughout said mass.

7. A stable sodium chloride tooth paste having a plastic body mass comprising glycerine, magnesium hydroxide, calcium carbonate and soap, and having incorporated therein sodium chloride in crystalline state and in amount from substantially 25% to substantially 75%.

WASHINGTON KYLE SHEFFIELD.
CHARLES H. DICKSON.